United States Patent [19]

Sweeney et al.

[11] Patent Number: 5,610,751
[45] Date of Patent: Mar. 11, 1997

[54] OPTICAL SCANNING DEVICE HAVING A SPHERICAL EXIT WINDOW

[75] Inventors: Michael N. Sweeney, Lake Orion; Brian L. Tiffany, Rochester Hills; Thomas J. Vettese, West Bloomfield; Mark S. Maiberger, New Baltimore, all of Mich.; John M. Rodgers, Pasadena, Calif.

[73] Assignee: Speedring Systems, Inc., Rochester Hills, Mich.

[21] Appl. No.: 557,489

[22] Filed: Nov. 14, 1995

[51] Int. Cl.$^6$ .................................. G02B 26/08
[52] U.S. Cl. .......................... 359/197; 359/211; 359/212; 359/220; 359/222; 359/226
[58] Field of Search .................................. 359/196–197, 359/209–216, 220–223, 226, 833, 834, 837; 347/257–261

[56] References Cited

U.S. PATENT DOCUMENTS

| | | |
|---|---|---|
| 3,874,778 | 4/1975 | Kato et al. . |
| 4,475,787 | 10/1984 | Starkweather ........................ 359/216 |
| 4,610,500 | 9/1986 | Kramer . |
| 4,726,640 | 2/1988 | Iwama et al. . |
| 4,805,972 | 2/1989 | Tanaka et al. . |
| 4,934,836 | 6/1990 | Tanaka et al. . |
| 5,046,797 | 9/1991 | Kurisu et al. . |
| 5,069,515 | 12/1991 | Itami et al. . |
| 5,084,883 | 1/1992 | Khalid et al. . |
| 5,214,528 | 5/1993 | Akanabe et al. . |
| 5,367,399 | 11/1994 | Kramer ................................ 359/206 |
| 5,408,352 | 4/1995 | Peng . |
| 5,420,713 | 5/1995 | Kunii . |
| 5,481,384 | 1/1996 | Kramer et al. ........................ 359/17 |

*Primary Examiner*—James Phan
*Attorney, Agent, or Firm*—Remy J. VanOphem; Thomas A. Meehan; John VanOphem

[57] ABSTRACT

An optical scanning device, for reflecting a light beam produced by a laser light source, having an entrance window; a rotatable scan optic having a reflective surface and a spherical exit window; the reflective surface of the rotatable scan optic positioned adjacent the entrance window and central to the spherical exit window such that the light beam successively encounters the entrance window, the reflective surface of the rotatable scan optic, and the spherical exit window surrounding the reflective surface of the rotatable scan optic, the light beam encountering and passing through the spherical exit window after being reflected away from the rotatable scan optic; the reflective surface of the rotatable scan optic circumscribed by a chamber defined by the entrance window, the rotatable scan optic device, and the spherical exit window.

17 Claims, 2 Drawing Sheets

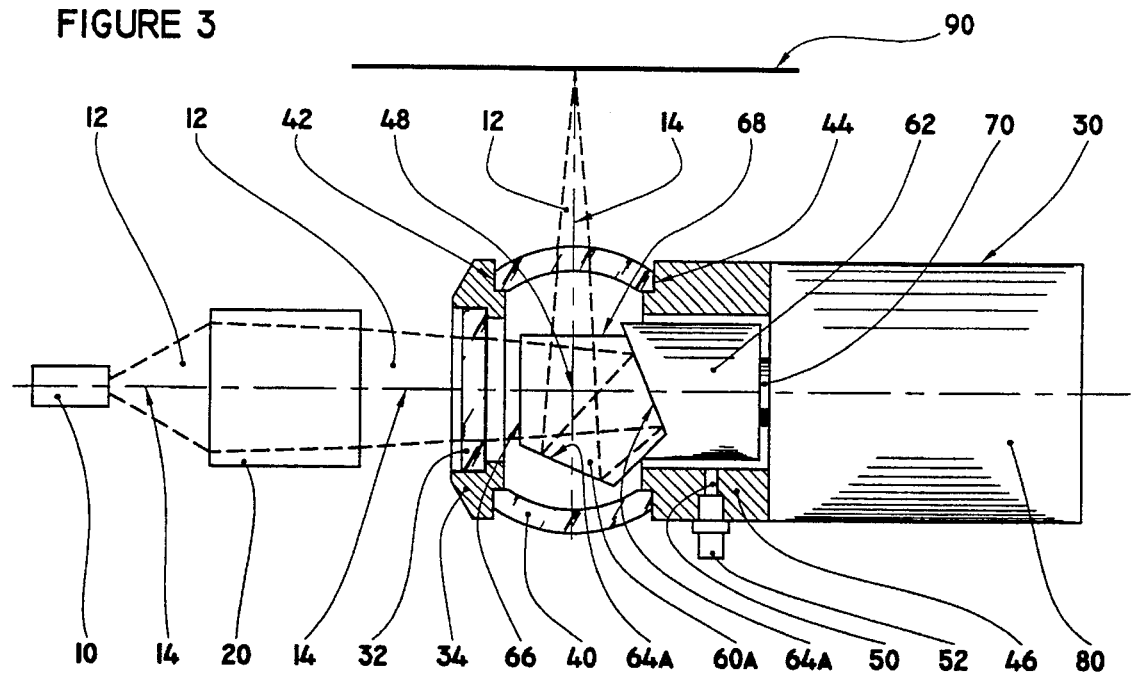
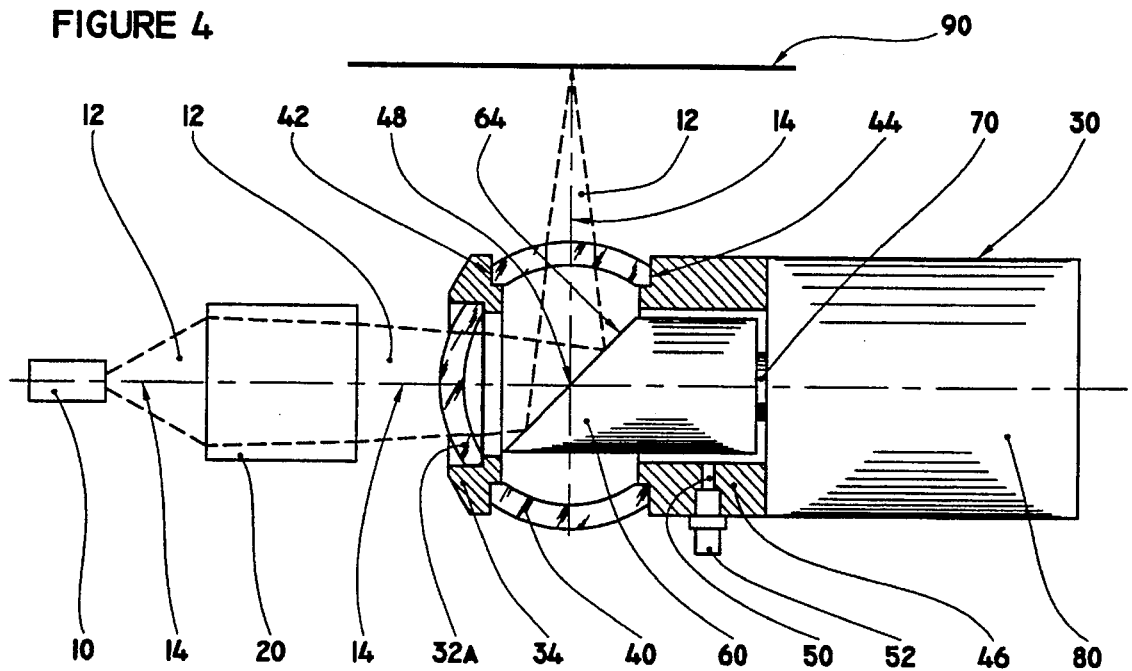

OPTICAL SCANNING DEVICE HAVING A SPHERICAL EXIT WINDOW

BACKGROUND OF THE INVENTION

1. Field of the Invention

The present invention relates to a high-speed optical scanning device, wherein a spherical exit window symmetrically surrounds a rotatable scan optic, for use in cylindrical field imaging applications and other wide scanning angle imaging applications in which scanning angles of up to 360° without asymmetric optical aberration are desirable.

2. Description of the Prior Art

In a typical laser imaging application, light beams produced by a laser light source, such as a helium-neon gas laser or a laser diode, are reflected from the reflective surface of an optical scanning device's rotatable scan optic and onto an imaging surface lined with photo-sensitive material, such as photo-sensitive paper or film. As a result, the light beams produce a two-dimensional image on the photo-sensitive material, consisting of a series of small dots.

The imaging surface itself may either be flat or curved, depending on the optical design configuration of the particular optical scanning device being utilized. In a typical cylindrical field imaging application, for example, the photo-sensitive material is first loaded onto the inside surface of a hollow cylindrical drum. Then, the optical scanning device is precisely moved along rails at a constant speed along the center axis of the drum in such a way that the photo-sensitive material attached to the surface of the drum is scanned and exposed to the light beams reflected by the rotating scan optic of the optical scanning device. The photo-sensitive material itself may either be retained on the outer surface of the drum, if the drum is composed of a transparent material, or the inner surface of the drum. In some alternative cylindrical field imaging applications, however, the scan optic is instead non-rotatable. In such alternative applications, the photo-sensitive material retained on the surface of the drum is successfully scanned via the drum's rotating about the non-rotatable scan optic as the optical scanning device moves along the center axis of the drum.

The rotatable scan optic of an optical scanning device typically consists of a single mirror, an assembly of more than one mirror, or a glass prism. The rotatable scan optic is commonly mounted on a shaft that is supported by some type of bearing assembly which includes radial and thrust bearings. The shaft itself is ultimately rotated by a motor which is driven by a controlling electronics system. See, for example, U.S. Pat. No. 4,726,640 to Iwama et al. Iwama et al is directed to the problem of wobble in the rotational axis of the rotatable scan optic as the rotatable scan optic rotates during a scanning operation, the extreme difficulty and high cost involved with producing precisely manufactured stationary and rotary shafts which require complicated grooving work and very accurate surface machining which is often associated with dynamic pressure pneumatic bearing assemblies, the problem of parts being worn down due to frictional contact commonly associated with dynamic pressure bearing assemblies at the beginning and end of each scanning operation, the extreme difficulty and high cost associated with maintaining balance of the rotatable scan optic and its bearing assembly, and obtaining overall device compactness. To overcome these problems, Iwama et al teach an optical scanning device which incorporates a dynamic pressure pneumatic bearing as a radial bearing and a magnetic bearing as a thrust bearing. In particular, the disclosed device teaches a hollow rotary shaft, integrated with a rotatable scan optic, and a stationary shaft disposed within the rotary shaft, the outer periphery of the stationary shaft and the inner periphery of the rotary shaft cooperatively constituting a dynamic pressure pneumatic bearing, an annular rotor magnet assembly mounted on the outer periphery of the rotary shaft adjacent to a lower end of the rotary shaft and magnetized to different polarities sequentially in a circumferential direction, a first rotary magnet mounted in the upper end portion of the rotary shaft, and a first stationary magnet mounted in an upper end portion of the stationary shaft to face the first rotary magnet with the same polarity as that of the first rotary magnet, the first rotary magnet and the first stationary magnet constituting a thrust magnetic bearing due to a repulsive force action therebetween.

U.S. Pat. No. 4,805,972 to Tanaka et al is a device which utilizes dynamic pressure gas bearings in order to confront the problem of wobble. In particular, wobble in such bearing assemblies is caused by error in the machining of the ball bearings, vibration caused by passage of the balls within the ball bearing assembly, and vibration caused by the retainer or the irregularity of rotation caused by the grease enclosed in the ball bearing assembly. As a result of such wobble, the life of the ball bearings is shortened due to the friction they are exposed to when the rotatable scan optic rotates at very high speeds. Another problem involves lubricants, such as grease, which are used within the ball bearing assembly staining the reflective surface of the rotatable scan optic. To overcome these problems, Tanaka et al teach the incorporation of dynamic pressure gas bearings as thrust and radial bearings instead of the ball bearings. In particular, the disclosed device teaches a dynamic gas bearing device in a rotatable unit in which a rotational member, put on a cantilevered fixed shaft, is designed such that an operating gas, generated by a dynamic pressure groove formed between the fixed shaft and the rotational member, is directed into a pressure chamber between the fixed shaft and the rotational member and supports the rotational member in the thrust direction and that the pressure in the pressure chamber is adjusted by a hole formed in the fixed shaft or the rotational member.

U.S. Pat. No. 4,934,836, also to Tanaka et al, is directed to the problems of radially balancing the weight of the rotatable scan optic and its bearing assembly, the extreme difficulty and high cost associated with machining a shaft assembly with precise machining accuracy, reducing the thrust load, and reducing frictional contact in the radial and thrust bearing surfaces of the bearing assembly at the beginning and end of scanning operations. To overcome these problems, Tanaka et al teach a reduced weight rotary member for reducing thrust load and radial/thrust bearings which are of the dynamic pressure type fluid bearing. In particular, the disclosed device teaches a housing which has a vertically extending cylindrical bore, with a radial bearing surface formed on the inner peripheral surface, and a thrust bearing surface formed on the inner bottom surface of the cylindrical bore. A shaft member, which is supported rotatably in the cylindrical bore of the housing, has a radial receiving surface and a thrust receiving surface respectively formed on the outer peripheral surface and the bottom surface. A dynamic pressure generating groove of a spiral shape is formed in at least one of the radial bearing surface and the radial receiving surface. When the shaft member is rotated, a gas in the housing is sucked by the pumping action of the dynamic pressure generating groove and flows into a pressure chamber between the thrust bearing surface and the thrust receiving surface through a radial space between the radial bearing surface and the radial receiving surface. In this way, the pressure in the pressure chamber can maintain the shaft member in a floating position at a predetermined vertical height.

U.S. Pat. No. 5,046,797 to Kirusi utilizes a radial air bearing and a magnetic protective cover in order to overcome problems associated with oil mist contaminating the reflective surface of the rotatable scan optic.

Finally, U.S. Pat. No. 5,069,515 to Itami et al is directed to the problems of correcting the weak rigidity of the thrust bearing, making the bearing assembly so that the optical scanning device is compact, reducing the lengthy time and difficulty in preparing/processing a rotary shaft, and reducing overall device cost and unnecessary parts. To overcome these problems, Itami et al teach achieving device compactness and reducing parts by reducing the axial length of the optical scanning device and overcoming a weak thrust bearing and difficulty in preparing a rotary shaft by teaching a hollow rotary shaft, with radial air bearings and a three-magnet thrust bearing or dynamic pressure thrust air, on top of a fixed shaft. In particular, the reference teaches an optical deflector of an air bearing type which has a fixed shaft; a rotary shaft having a hollow portion fitted onto the fixed shaft; a support device disposed between an end portion of the fixed shaft and an end portion of the hollow portion opposite thereto and supporting the rotary shaft in an axial direction thereof; a radial air bearing formed between an inner circumferential face of the hollow portion and an outer circumferential face of the fixed shaft; a polygon mirror fixed to the rotary shaft; a driving device for rotating the rotary shaft; and a device for deflecting light irradiated onto the polygon mirror by rotating the rotary shaft through the driving device. The support device has a first magnet directly attached onto an end face of the fixed shaft, a second magnet opposite to the first magnet and attached to the hollow portion of the rotary shaft, and a third magnet opposite to the second magnet and attached to a casing for covering the polygon mirror. Magnetic poles of the first, second, and third magnets are opposite to each other to generate magnetic repulsive force.

In order to obtain a high resolution image on a given imaging surface in as short amount of time as possible, it becomes necessary to rotate the rotatable scan optic of an optical scanning device at a very high rotational speed, typically on the order of twenty thousand (20,000 rpm) revolutions per minute or higher. The rotating speed of an optical scanning device's scan optic is commonly referred to as that device's "scan rate." Thus, the image-producing productivity of a given optical scanning device is largely dependent upon the scan rate of the device's scan optic, for a higher scan rate generates high-resolution images faster. However, higher scan rates also generate numerous undesirable side effects which are magnified as rotational speed increases above 20,000 rpm.

The worst of these undesirable side effects include the problems of loud noise, excessive wobble, scan optic contamination, and scan optic abrasion. The problem of loud noise arises when excessive wind turbulence is generated by a scan optic rotating at a high rotational speed. Such wind turbulence often produces a high-pitched noise which may be extremely irritating to an operator of the optical scanning device. The problem of excess wobble arises when excessive wind turbulence generated by a scan optic rotating at a high rotational speed causes a random jitter or wobble in the scan optic's rotational axis. Such wobble often produces undesirable perturbations in the scan lines which are formed on the imaging surface, thus degrading an image's overall quality. The problem of scan optic contamination arises when excessive wind turbulence generated by a scan optic rotating at a high rotational speed causes dust and other contaminants to swirl and accumulate on the reflective surface of the rotatable scan optic. Such contamination can degrade overall image quality. The problem of scan optic abrasion occurs over time such that the reflective surface is abraded by the swirling dust and other contaminants which strike the reflective surface of the scan optic at high speed. Eventually, the cumulative effects of these collisions deteriorate the reflective surface, and can likewise degrade overall image quality. In short, these problems tend to escalate as scan rates for optical scanning devices are increased.

In early attempts to solve some of these problems, high-speed optical scanning devices consisting of streamlined rotatable scan optics were developed as a solution for reducing wind turbulence in order to ultimately reduce loud noise, excessive wobble, scan optic contamination, and scan optic abrasion problems. In addition, aerodynamic shields and baffles which serve to control air flow about the rotatable scan optics were developed as well. Even sound-deadening foam was used in an attempt to further reduce the loud noise problem. However, when such solutions are incorporated in a given optical scanning device, they each add significant cost to the production of the device. This fact along with the continuing modern trend toward optical scanning devices having even faster scan rates renders such solutions as not only economically unfeasible but also technically unfeasible, for any modern high-speed optical scanning device which incorporates such solutions will be difficult to produce and most likely will be priced out of the modern market.

In more recent attempts to solve the known problems associated with high-speed optical scanning devices, it has been demonstrated that wind turbulence generated by rotating the rotatable scan optic of an optical scanning device can be substantially reduced by housing the rotating scan optic in an enclosure designed in such a way that the enclosure's internal surfaces are in close proximity to the rotating surface(s) of the rotating scan optic. See, for example, U.S. Pat. No. 4,610,500 to Kramer which is directed to the problem of optical scanning devices being uniquely and specifically designed for very narrow applications and not being adaptable, as a unitary device, for various applications which depend on the specific wavelength of laser light which is used, imaging surface characteristics, scan length, scan resolution, and space which is available to accommodate the optical scanning device itself. To overcome these problems, Kramer teaches an optical scanning device, as a unitary device when fully assembled, having a rotatable scan optic, a drive motor, and light beam focusing optics which will meet the specific requirements of many different applications, such requirements including specific laser wavelengths, resolutions, and scan angles. In particular, the disclosed device teaches a unitary assembly which includes a rotatable scan optic, a motor for rotating the rotatable scan optic, and a lens for focusing a deflected laser beam on an image surface. A housing, including a base plate and a cover removably mounted on the base plate, encloses the rotatable scan optic. The base plate has a surface with respect to which the position of the rotatable scan optic and lens is referenced. The cover has a platform on which lenses are interchangeably mounted such that each lens has the correct position and orientation with respect to the entrance pupil of the optical scanning device. The rotatable scan optic is also removably mounted on the shaft of the motor and referenced against a shoulder of the shaft which is precisely spaced with respect to the reference surface of the base plate of the housing. The unitary assembly may be installed in a laser printer, or other device requiring a scanner, aligned with the light beam of the laser light source which enters an opening in the housing below the rotatable scan optic, a hologon disc. The light beam is deflected and scanned by the facets of the rotatable scan optic and focused by the lens onto an imaging surface, such as the drum or belt on which a latent electrostatic image is formed by the scanned light beam.

U.S. Pat. No. 5,084,883 to Khalid et al, is directed to the problems of realignment difficulty when a component of an optical scanning device needs to be replaced, poor light beam quality commonly produced by laser diode light sources, and preventing bearing assembly lubricant particles from getting onto the reflective surface of the rotatable scan optic and scan lens. To overcome these problems, Khalid et al teach an optical scanning device which does not require realignment when a device component needs to be replaced, manipulating and modifying the light beam emitted from a laser diode in an inexpensive manner so that it can be used in high quality imaging, and mounting the laser light source, rotatable scan optic, and scan lens to a support body in a gas tight manner. The support body is preferably provided with a conduit for gas flow communication, specifically for introducing a gas under pressure and maintaining a positive pressure inside the support body. This ensures that any lubricant particles from the bearing assembly will not enter the support body and contaminate the reflective surface of the rotatable scan optic and/or the scan lens.

By enclosing the rotatable scan optic of an optical scanning device in an enclosure in such a way that the enclosure's internal surfaces are in close proximity to the rotating surfaces of the rotating scan optic, the wind turbulence generated by the rotating scan optic can be substantially reduced. Particularly, the ambient air within such an enclosure tends to flow uniformly in a circular fashion along with the surface of the rotating scan optic as the scan optic rotates about its rotational axis, thus substantially reducing wind turbulence directed toward the scan optic's rotational axis. The direct results of such a reduction in wind turbulence are less noise, reduced wobble, negligible scan optic contamination, and reduced scan optic abrasion.

In an effort to include a scan optic enclosure in an optical scanning device, many modern optical scanning devices have been designed with scan optic enclosures incorporating entrance and exit windows that allow light beams produced by laser light sources to enter the enclosure, be reflected from the rotating scan optic, and exit the enclosure for imaging. Such modern devices typically are designed such that the entrance and exit windows are flat. Utilizing flat windows, however, gives rise to a significant problem if the optical scanning device is to be utilized in cylindrical field imaging applications and other wide scanning angle imaging applications, particularly if the exit window is flat. For example, utilizing a flat exit window in an optical scanning device generally limits the device to applications merely requiring small scanning angles of less than 60°. Thus, whereas a design incorporating a flat exit window may be, for the most part, acceptable for optical scanning devices utilized in flat field imaging applications which merely necessitate small scanning angle capability, such a design is not acceptable for cylindrical field imaging applications and other wide scanning angle applications requiring scanning angles greater than 60° and up to 360°.

A potential design solution to the problem of including a scan optic enclosure without limiting wide scanning angle capability would be to fully surround the rotating scan optic with a cylindrical exit window. Although such a design solution would provide an optical scanning device with large scanning angle capability, the cylindrical shape of the exit window would introduce undesirable asymmetric aberrations to the laser light beams as they passed through the cylindrical exit window, thus ultimately degrading image quality. Such asymmetric aberrations are indeed a significant problem, for they cannot be easily corrected in a conventional optical system.

In sum, the prior art has yet to develop an optical scanning device which effectively prevents wind turbulence, loud noise, wobble, scan optic contamination, and scan optic abrasion and which simultaneously possesses wide scanning angle capability of up to 360° without asymmetric aberrations. It is the object of the present invention to address and solve this problem.

SUMMARY OF THE INVENTION

The present invention relates to an optical scanning device which reflects light beams produced by a laser light source, the optical scanning device essentially having an entrance window; a rotatable scan optic having a reflective surface, the reflective surface of the rotatable scan optic positioned adjacent the entrance window such that the light beam successively encounters the entrance window, passes through the entrance window, encounters the reflective surface of the rotatable scan optic, and is reflected away from the rotatable scan optic; a device for rotating the rotatable scan optic, the rotation device positioned contiguous the rotatable scan optic; and a spherical exit window surrounding the reflective surface of the rotatable scan optic, the spherical exit window having a center, a truncated top at one end, the truncated top of the spherical exit window positioned adjacent the entrance window such that the entrance window faces the center of the spherical exit window, and a truncated bottom at an opposite end, the truncated bottom positioned contiguous the rotation device, the light beam encountering and passing through the spherical exit window after being reflected away from the rotatable scan optic, the reflective surface of the rotatable scan optic circumscribed by a chamber defined by the entrance window, the rotation device, and the spherical exit window. The present invention further relates to the above-described optical scanning device wherein the chamber, alternatively, has a vacuum port which penetrates the chamber and provides gaseous communication between the inside of the chamber and the outside of the chamber.

It is a first object of the present invention to provide a high-speed optical scanning device having a scan optic enclosure which can be utilized in cylindrical field imaging applications and other wide scanning angle imaging applications without introducing the problem of asymmetric optical aberration. The present invention achieves this first object by surrounding a rotatable scan optic with an exit window that is uniquely spherical in shape, i.e. a spherical exit window. More particularly, the spherical exit window is positioned to surround the rotatable scan optic in such a way that the spherical exit window is symmetrical with respect to the rotatable scan optic's rotational axis. Such positioning of the spherical exit window enables the rotatable scan optic to reflect light beams, which are incident upon its reflective surface, through the spherical exit window at a scanning angle of up to 360° as the rotatable scan optic rotates about its rotational axis. Although the utilization of a spherical exit window introduces small amounts of optical power and spherical optical aberration, such optically symmetric errors are significantly easier to correct than the optically asymmetric errors introduced by exit windows which are of other shapes.

It is a second object of the present invention to provide a high-speed optical scanning device having a scan optic enclosure which essentially eliminates all problems of noise, wobble, scan optic contamination, and scan optic abrasion. The present invention achieves this second object by enclosing the rotatable scan optic in a chamber which is essentially defined by an entrance window, a rotation device for rotating the rotatable scan optic, and the spherical exit window. The chamber significantly reduces wind turbulence by restricting ambient air flow to a uniform circular motion along with the surfaces of the rotating scan optic as the scan optic rotates about its rotational axis within the chamber. Alternatively, the chamber itself can be evacuated by way of a vacuum port which penetrates the chamber and allows gaseous communication between the inside of the chamber and the outside of the chamber. Such evacuation of the chamber essentially serves to eliminate wind turbulence within the chamber and about the rotatable scan optic as the scan optic rotates about its rotational axis within the chamber. Ultimately, the reduction or absence of such wind turbulence serves to prevent the above-discussed problems of noise, wobble, scan optic contamination, and scan optic abrasion which are commonly associated with wind turbulence that is generated from the rotatable scan optic rotating at high speeds.

It is a third object of the present invention to provide a high-speed optical scanning device which can be manufactured at a reasonable cost. The present invention achieves this third object by avoiding the necessary incorporation of expensive structural items such as aerodynamic shields, baffles, and/or sound-deadening foam to reduce the problems of noise, wobble, scan optic contamination, and scan optic abrasion.

The above and other objects, features, and advantages of the present invention will become apparent from the following description and appended claims, taken in conjunction with the accompanying drawings.

BRIEF DESCRIPTION OF THE DRAWINGS

FIG. 3 is a partially cross-sectional view of an optical scanning device having a spherical exit window, a planar entrance window, and a penta-prism scan optic, wherein the view depicts a cylindrical field imaging application; and FIG. 4 is a partially cross-sectional view of an optical scanning device having a spherical exit window, a spherical entrance window, and a single-facet scan optic, wherein the view depicts a cylindrical field imaging application.

DETAILED DESCRIPTION OF THE PREFERRED EMBODIMENT

Figure 1:
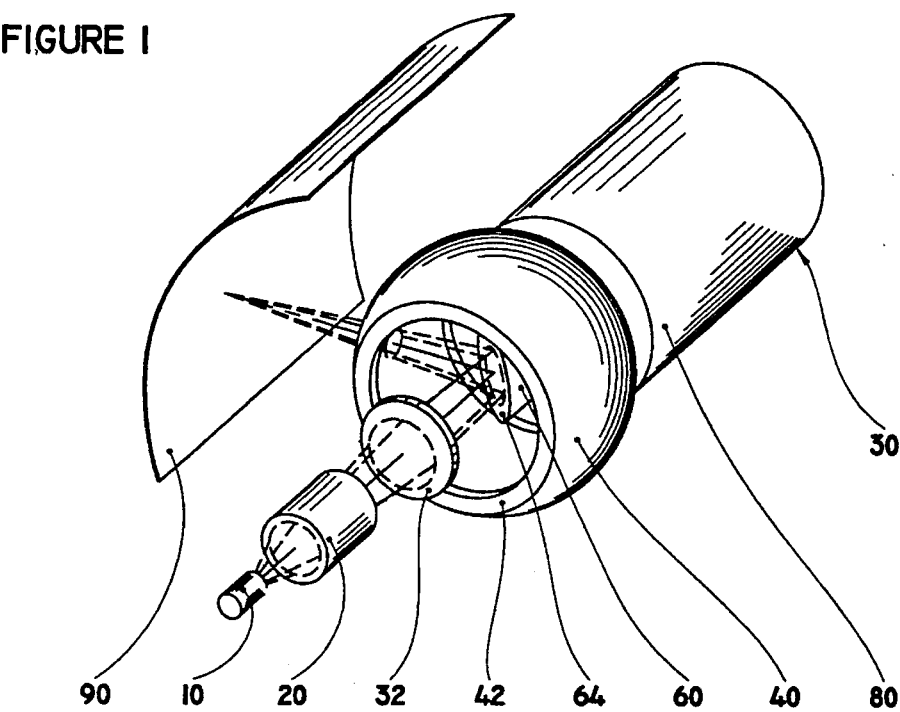
FIG. 1 is an exploded three-dimensional view of an optical scanning device having a spherical exit window, a planar entrance window, and a single-facet scan optic, wherein the view depicts a cylindrical field imaging application.

FIG. 1 is an exploded three-dimensional view of an optical scanning device 30 having a spherical exit window 40, a planar entrance window 32, and a single-facet scan optic 60, wherein the view generally depicts a cylindrical field imaging application by way of example. In addition, FIG. 2 is a partially cross-sectional view of the same optical scanning device 30 having the spherical exit window 40, the planar entrance window 32, and the single-facet scan optic 60, wherein the view depicts, in more detail, a cylindrical field imaging application by way of example.

Figure 2:
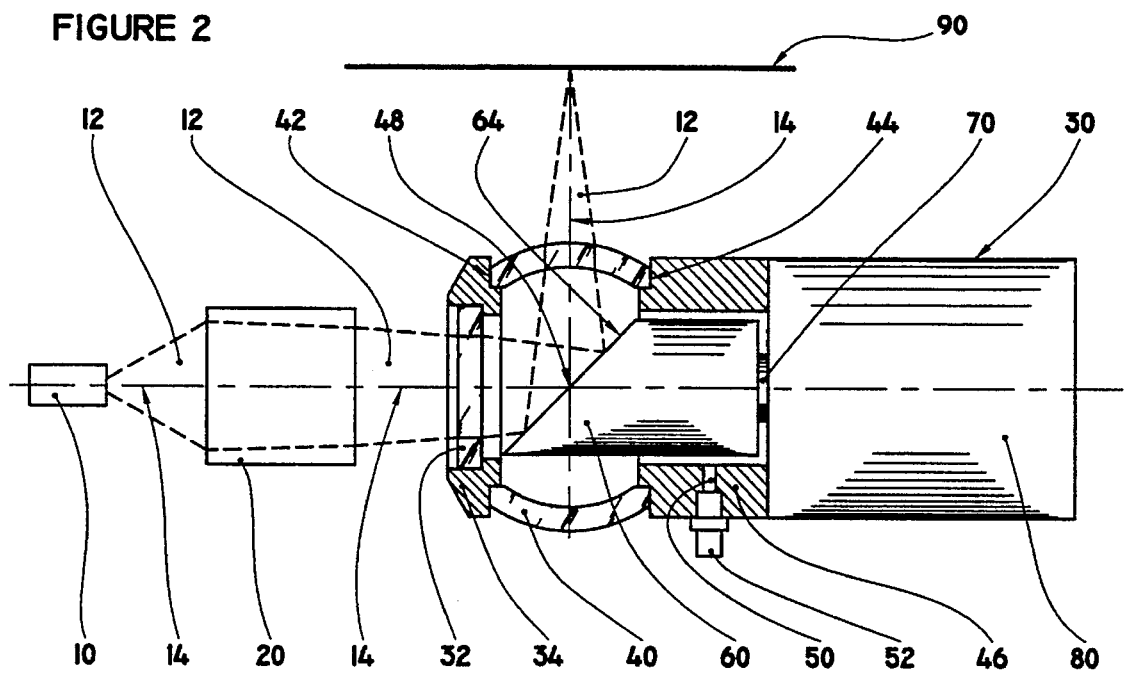
FIG. 2 is a partially cross-sectional view of an optical scanning device having a spherical exit window, a planar entrance window, and a single-facet scan optic, wherein the view depicts a cylindrical field imaging application.

The cylindrical field imaging application, as depicted in FIG. 1 and FIG. 2, is typically executed through the utilization of four discrete components: a laser light source 10, an optical beam delivery system 20, the optical scanning device 30, and a cylindrical imaging surface 90. The optical scanning device itself, according to the preferred embodiment of the present invention, includes the planar entrance window 32, the single-face scan optic 60 having a reflective surface 64, the spherical exit window 40 and a casing 80 which houses a motor and bearing assembly.

The laser light source 10 may be of any type, including a gas or laser diode type, which produces a light beam 12 having a circular cross section and a central axis 14. The central axis 14 of the light beam 12 is defined by the center of the light beam 12 as the light beam travels through space and other various media. In particular, the laser light source 10 produces and directs the light beam 12 so that the light beam 12 diverges and encounters the optical beam delivery system 20.

The optical beam delivery system 20 is composed of one or more lenses, and may additionally include one or more mirrors, positioned along the optical path of the light beam 12 produced by the laser light source 10. The optical beam delivery system 20 serves to optically manipulate the light beam 12, so that the light beam 12 is no longer diverging and is at least collimated, and directs the light beam 12 in a predetermined optical path, so that the light beam 12 encounters the planar entrance window 32 of the optical scanning device 30. According to the preferred embodiment of the present invention, the optical beam delivery system 20 is primarily composed of two optical-quality glass lenses mounted and housed within a lens barrel. The laser light source 10 and the optical beam delivery system 20 are positioned relative to each other so that the light beam 12 enters the lens barrel and successively passes through the two lenses positioned within the lens barrel. In this manner, the light beam 12 is initially collimated by the first lens it encounters within the lens barrel and is next refocused by the second lens into a converging light beam.

After the light beam 12 has passed through the optical beam delivery system 20, the light beam 12 next encounters and passes through the planar entrance window 32 of the optical scanning device 30 which is positioned in the predetermined optical path of the light beam 12. According to the preferred embodiment of the present invention, the planar entrance window 32 is typically transparent in the visible wavelengths and made of optical-quality glass, although other materials with glass-like optical characteristics may be used depending on the wavelength of the laser light source used. In addition, the optical beam delivery system 20 should be positioned relative to the planar entrance window 32 such that the central axis 14 of the light beam 12 is normal with respect to the planar entrance window 32 as the light beam 12 encounters and passes through the planar entrance window 32.

Regarding the spherical exit window 40, the spherical exit window 40 is manufactured such that it is shaped like a hollow sphere having a truncated top at one end, a center 48, and a truncated bottom at an opposite end. For the purpose of geometrical and optical symmetry, the spherical exit window 40 is formed such that the truncated top forms a circular upper rim 42 and the truncated bottom forms a circular lower rim 44. According to the preferred embodiment of the present invention, the upper rim 42 and the lower rim 44 of the spherical exit window 40 are shaped and positioned relative to each other such that they define two circles lying in planes which are parallel to each other, each plane being perpendicular to a line which passes through the center of these two circles. Although such precise geometrical symmetry is preferred, minor deviations from such precise geometrical symmetry may be tolerable depending on the particular imaging application to be executed. The spherical exit window 40 itself is typically transparent in the visible wavelengths and is made of optical-quality glass, although other materials with glass-like characteristics may be used depending on the wavelength of the laser light source used.

According to the preferred embodiment of the present invention, the planar entrance window 32 is positioned adjacent and mounted to an entrance window mount 34 common to both the planar entrance window 32 and spherical exit window 40. The outer portion of the entrance window mount 34 is mounted adjacent to the upper rim 42 of the spherical exit window 40. As a result, the planar entrance window 32 and the entrance window mount 34 serve to cover the truncated top end of the spherical exit window 40. In particular, the planar entrance window 32 should be mounted such that it is parallel with respect to the upper rim 42 of the spherical exit window 40.

According to the preferred embodiment of the present invention, the lower rim 44 of the spherical exit window 40 is mounted on one end of an exit window mount 46. The exit window mount 46 itself is shaped like a hollow cylinder. The other end of the exit window mount 46 is fastened to the casing 80 in any appropriate manner. In addition, the exit window mount 46 has a vacuum port 50 which penetrates the cylindrical wall of the exit window mount 46. The vacuum port 50 itself may be accessed from outside of the exit window mount 46 by way of a vacuum port fitting 52. After assembling the planar entrance window 32 and spherical exit window 40 to their respective mounts 34 and 46 it is important that the center 48 of the spherical exit window 40 intersect the reflective surface 64 exactly at the point where the central axis 14 of the light beam 12 and the rotational axis of the optical scanning device 30 coincide.

After the light beam 12 has passed through the planar entrance window 32, the light beam 12 next encounters the reflective surface 64 of the single-facet scan optic 60. The reflective surface 64 is surrounded by the spherical exit window 40 and is positioned at a predetermined angle with respect to the planar entrance window 32 such that the light beam 12 successively passes through the planar entrance window 32, encounters the reflective surface 64 of the single-facet scan optic 60, is reflected away from the single-facet scan optic 60, and passes through the spherical exit window 40. According to the preferred embodiment of the present invention, the optical beam delivery system 20, the planar entrance window 32, the reflective surface 64 of the single-facet scan optic 60, and the spherical exit window 40 should all be positioned relative to each other such that the central axis 14 of the light beam 12 is coincident with the center 48 of the spherical exit window 40 at the point of reflection from the reflective surface 64 of the single-facet scan optic 60. It then follows that such relative positioning dictates that the light beam 12 encounter and pass through the spherical exit window 40 such that the central axis 14 of the light beam 12 is normal to the spherical exit window 40.

After the light beam 12 has passed through the spherical exit window 40, the light beam 12 converges to a point upon the cylindrical imaging surface 90. The cylindrical imaging surface 90 surrounds the outside of the spherical exit window 40 such that any light beam 12 which passes through the spherical exit window 40 properly converges to a point upon the cylindrical imaging surface 90, ultimately forming an image on the photo-sensitive surface of the cylindrical imaging surface 90.

As mentioned earlier, the reflective surface 64 of the single-facet scan optic 60 is positioned at a predetermined angle with respect to the planar entrance window 32. Such positioning permits any light beam 12 which encounters the reflective surface 64 to be reflected away from the single-facet scan optic 60 at a "folding angle" such that the light beam 12 passes through the spherical exit window 40. A "folding angle" is defined as an angle measured from the central axis 14 of the light beam 12 just before the light beam 12 encounters the reflective surface 64 of the single-facet scan optic 60 to the central axis 14 of the light beam 12 after the light beam 12 has departed from the reflective surface 64 of the single-facet scan optic 60. Although FIG. 2 depicts a folding angle of approximately 90°, other folding angles may instead be utilized. In fact, depending upon the particular application for which the optical scanning device 30 is to be utilized, a folding angle other than 90° may be preferred, for a folding angle of 90° causes the light beam 12 to converge upon the cylindrical imaging surface 90 such that the central axis 14 of the light beam 12 is normal with respect to the cylindrical imaging surface 90 and undesired light is reflected back into the spherical exit window 40 of the optical scanning device 30. To avoid such reflections of light back into the spherical exit window 40, the angle of the reflective surface 64 of the single-facet scan optic 60 with respect to the planar entrance window 32 should be adjusted such that the folding angle is close to but not exactly 90°.

The single-facet scan optic 60 is mounted on the exposed end of a shaft 70, which protrudes from the casing 80, such that the reflective surface 64 of the single-facet scan optic 60 is surrounded by the spherical exit window 40. The casing 80 itself houses the other end of the shaft 70. During operation of the optical scanning device 30, the shaft 70 serves to rotate the single-facet scan optic 60 and its reflective surface 64 on the rotational axis of the shaft 70 through angles of up to 360°. The shaft 70, according to the preferred embodiment, is supported by a bearing assembly (not shown) which includes radial and thrust air bearings housed within the casing 80. However, other types of bearing assemblies, such as ball bearings, air/gas bearings, fluid bearings, magnetic bearings, or any combination thereof which is disclosed in the prior art, may instead be utilized. In addition, the shaft 70 is rotated about its rotational axis by a motor, also housed within the casing 80, which acts upon the housed end of the shaft 70. The motor housed within the casing 80 is controlled externally by an electronic control system.

The single-facet scan optic 60 is mounted on the shaft 70 such that the rotational axis of the shaft 70 is collinear with the central axis 14 of the light beam 12 as the light beam 12 encounters the planar entrance window 32. In addition, the rotational axis of the shaft 70 is also positioned such that center 48 of the spherical exit window 40 is coincident with the reflective surface precisely at the point where the central axis 14 of the light beam 12 and rotational axis of the optical scanning device 30 intersect with the reflective surface.

Given such positioning, in addition to the ability of the reflective surface 64 of the single-facet scan optic 60 to rotate 360° via the shaft 70 supported by an air bearing assembly, the reflective surface 64 can successfully reflect incident light beams 12 through the spherical exit window 40 at a scanning angle of up to 360° as the single-facet scan optic 60 rotates via the shaft 70 upon the air bearing assembly housed within the casing 80 during operation of the optical scanning device 30.

According to the preferred embodiment of the present invention and with final regard to FIG. 1 and FIG. 2, the enclosure or chamber which encloses the single-facet scan optic 60 and its reflective surface 64 is formed and defined primarily by the planar entrance window 32, the entrance window mount 34, the spherical exit window 40, the exit window mount 46, the shaft 70, and the casing 80. The chamber also includes the vacuum port 50, as mentioned above, which penetrates the exit window mount 46 of the chamber and provides gaseous communication between the inside of the chamber and the outside of the chamber. The vacuum port 50, however, may instead be placed in other sections of the chamber as well. For example, the vacuum port 50 could instead be routed through the casing 80.

FIG. 3 is a partially cross-sectional view of an alternative optical scanning device 30 having the spherical exit window 40, the planar entrance window 32, and a penta-prism scan optic 60A, wherein the view depicts a cylindrical field imaging application by way of example. The particular embodiment illustrated in FIG. 3 is quite similar to the embodiment illustrated in FIG. 1 and FIG. 2 except that the single-facet scan optic 60 illustrated in FIG. 1 and FIG. 2 has been replaced with the penta-prism scan optic 60A which is mounted on top of a prism mount 62, the bottom of the prism mount 62 being mounted on the shaft 70.

According to the alternate embodiment, the penta-prism scan optic 60A itself has a body which is surrounded by the spherical exit window 40, an incident surface 66 which faces and is parallel to the planar entrance window 32, two internal reflective surfaces 64A which are positioned within the body to direct laser light beams 12 passing through the body, and an exiting surface 68 which is perpendicular to the incident surface 66 such that the exiting surface 68 faces the spherical exit window 40. More particularly, the internal reflective surfaces 64A serve to receive the light beam 12 which encounters and passes through the incident surface 66, reflect and direct the light beam 12 through the body of the penta-prism scan optic 60A, and direct the light beam 12 through the exiting surface 68 and ultimately through the spherical exit window 40 so that the light beam 12 converges to a point and forms an image on the photo-sensitive surface of the cylindrical imaging surface 90. Most important, however, is the fact that the central axis 14 of the light beam 12 passes through the center 48 of the spherical exit window 40 twice: after passing through the incident surface 66 but before encountering the internal reflective surfaces 64A, and after being reflected away from the internal reflective surfaces 64A but before encountering the exiting surface 68.

The advantage of incorporating the penta-prism scan optic 60A, as opposed to incorporating the single-facet scan optic 60 of FIG. 1 and FIG. 2, into the optical scanning device 30 is that the penta-prism scan optic 60A, by its inherent structural nature, is essentially immune from undesired scan line perturbations which are commonly formed on the cylindrical imaging surface 90 due to wobble in the rotational axis of the shaft 70. In particular, the internal reflective surfaces 64A of the penta-prism scan optic 60A are each positioned relative to each other such that any undesired scan line perturbations which might result from wobble experienced by the rotational axis of the shaft 70 are cancelled out by the optically cooperative positioning of the internal reflective surfaces 64A within the body of the penta-prism scan optic 60A.

FIG. 4 is a partially cross-sectional view of the optical scanning device 30 having the spherical exit window 40, a spherical entrance window 32A, and the single-facet scan optic 60, wherein the view depicts a cylindrical field imaging application by way of example. The particular embodiment illustrated in FIG. 4 is quite similar to the embodiment illustrated in FIG. 1 and FIG. 2 except that the planar entrance window 32 illustrated in FIG. 1 and FIG. 2 has been replaced with the spherical entrance window 32A.

According to the embodiment of FIG. 4, the spherical entrance window 32A is mounted to the entrance window mount 34. The spherical entrance window 32A itself has a convex outer surface, which faces the optical beam delivery system 20, and a concave inner surface, which faces the center 48 of the spherical exit window 40 and the single-facet scan optic 60.

The advantage of incorporating the spherical entrance window 32A, as opposed to incorporating the planar entrance window 32 of FIG. 2, into the optical scanning device 30 is that the spherical entrance window 32A can be selected such that it cancels out undesired optical power and primary spherical aberration which are introduced by the spherical exit window 40 into an image formed on the cylindrical imaging surface 90. In particular, if the spherical entrance window 32A is selected such that it has equal but opposite power and spherical aberration to the spherical exit window 40 and is incorporated into the optical scanning device 30, then the optical scanning device 30 may be incorporated within any host imaging system without introducing undesired optical power or spherical aberration into the host imaging system. In contrast, utilizing a planar entrance window 32, as in FIG. 2, fails to correct the symmetrical errors of optical power and primary spherical aberration which may be introduced by the spherical exit window 40. As a result, if the optical scanning device 30 incorporates a planar entrance window 32, the host imaging system in which the optical scanning device 30 is incorporated must itself correct the symmetrical errors of optical power and primary spherical aberration introduced by the spherical exit window 40. For example, the symmetric errors of optical power and primary spherical aberration may be corrected by changing the optical characteristics of the optical beam delivery system 20 or by inserting a corrective optical component into the path of the light beam 12 before the light beam 12 encounters and passes through the planar entrance window 32 illustrated in FIG. 2. However, other modifications of the host optical system to correct symmetrical errors of optical power and primary spherical aberration, which undoubtedly suggest themselves to those skilled in the art, may instead be utilized.

In summary, although the above description has been given in light of a cylindrical field imaging application, it should be noted that the present invention may also be used in planar field imaging applications as well. The present invention is herein described in light of a cylindrical field imaging application to highlight its unique ability to scan images at up to 360° without introducing asymmetric optical aberration.

Other modifications of the herein described optical scanning device are possible and may include variations of scan optics, entrance windows, bearing assembly configurations, etcetera. All such modifications, however, should be deemed obvious in light of the present invention, for all such modifications directly benefit from the above description which discloses how the advantages of reduced wind turbulence, less noise, reduced wobble, negligible scan optic contamination, reduced scan optic abrasion, and wide scanning angle capability of up to 360° without asymmetric optical aberration can be embodied within a single optical scanning device.

It will be apparent from the above description that numerous variations and modifications of the herein described optical scanning device, within the scope of the present invention, will undoubtedly suggest themselves to those skilled in the art. Accordingly, the foregoing description is to be taken by way of illustration only and is intended to be limited only according to the scope of the claims appended hereto.

What is claimed is:

1. An optical scanning device for reflecting a light beam produced by a laser light source, said optical scanning device comprising:

an entrance window;

a rotatable scan optic having a reflective surface, said reflective surface of said rotatable scan optic positioned adjacent said entrance window such that said light beam successively encounters said entrance window, passes through said entrance window, encounters said reflective surface of said rotatable scan optic, and is reflected away from said rotatable scan optic;

means for rotating said rotatable scan optic, said rotation means positioned contiguous said rotatable scan optic; and a spherical exit window surrounding said reflective surface of said rotatable scan optic, said spherical exit window having a center, a top at one end, and a bottom at an opposite end, said top of said spherical exit window being adjacent said entrance window such that said entrance window faces said center of said spherical exit window, said bottom positioned adjacent said rotation means, such that said light beam encounters and passes through said spherical exit window after being reflected away from said rotatable scan optic, said reflective surface of said rotatable scan optic circumscribed by a chamber defined by said entrance window, said rotation means, and said spherical exit window.

2. An optical scanning device according to claim 1, wherein said spherical exit window is comprised of glass.

3. An optical scanning device according to claim 1, wherein said entrance window is planar.

4. An optical scanning device according to claim 1, wherein said entrance window is spherical and comprises a concave inner surface facing said center of said spherical exit window and a convex outer surface facing away from said center of said spherical exit window.

5. An optical scanning device according to claim 1, wherein said reflective surface of said rotatable scan optic is comprised of a single reflecting facet.

6. An optical scanning device according to claim 1, wherein said rotatable scan optic is a prism.

7. An optical scanning device according to claim 6, wherein said prism is a penta-prism, said penta-prism comprising:

a body surrounded by said spherical exit window;

an incident surface facing said entrance window and positioned contiguous said body of said penta-prism, said light beam encountering and entering said penta-prism at said incident surface after passing through said entrance window;

internal reflective surfaces positioned contiguous said body of said penta-prism, said internal reflective surfaces receiving said light beam from said incident surface and directing said light beam through said body of said penta-prism; and an exiting surface facing said spherical exit window and positioned contiguous said body of said penta-prism, said internal reflective surfaces cooperatively directing said light beam through said exiting surface.

8. An optical scanning device according to claim 1, wherein said chamber has a vacuum port which penetrates said chamber, said vacuum port providing gaseous communication between the inside of said chamber and the outside of said chamber.

9. An optical scanning device according to claim 1, wherein said light beam encounters said reflective surface of said rotatable scan optic and is reflected away from said rotatable scan optic at a folding angle of substantially 90°, said folding angle being measured from the central axis of said light beam just before said light beam encounters said reflective surface of said rotatable scan optic to the central axis of said light beam just after said light beam is reflected away from said rotatable scan optic.

10. An optical scanning device according to claim 1, wherein said light beam encounters said entrance window such that the central axis of said light beam is normal with respect to said entrance window, and wherein said light beam encounters said entrance window such that the central axis of said light beam is collinear with said center of said spherical exit window.

11. An optical scanning device according to claim 1, wherein said light beam is reflected away from said rotatable scan optic such that the central axis of said light beam is collinear with said center of said spherical exit window, and wherein said light beam encounters said spherical exit window such that the central axis of said light beam is normal with respect to said spherical exit window.

12. An optical scanning device according to claim 1, wherein said rotation means has a rotational axis collinear with said center of said spherical exit window.

13. An optical scanning device according to claim 12, wherein said light beam encounters said entrance window such that the central axis of said light beam is collinear with said rotational axis of said rotation means.

14. An optical scanning device according to claim 12, wherein said top of said spherical exit window forms a circular upper rim and said bottom of said spherical exit window forms a circular lower rim, said circular upper rim and said circular lower rim lying in planes which are parallel to each other, each plane of said planes positioned perpendicular to said rotational axis of said rotation means, said circular upper rim and said circular lower rim defining circles having centers, said rotational axis positioned collinear with each center of said centers.

15. The optical scanning device of claim 1 further comprising means for mounting said spherical exit window to said means for rotating said rotatable scan optic.

16. The optical scanning device of claim 15 wherein said means for mounting said spherical exit window to said means for rotating said scan optic further comprises:

a spherical exit window mount; and a vacuum port mounted to said spherical exit window mount, said vacuum port providing gaseous communication between said chamber and the surrounding environment.

17. The optical scanning device of claim 1 further comprising means for mounting said entrance window to said top of said spherical exit window.

* * * * *